United States Patent [19]

Takizawa

[11] Patent Number: 5,792,396
[45] Date of Patent: Aug. 11, 1998

[54] POSITION DETECTING SYSTEM FOR AN INJECTION MOLDING APPARATUS

[75] Inventor: Michiaki Takizawa, Nagano, Japan

[73] Assignee: Nissei Plastic Industrial Co. Ltd., Nagano-Ken, Japan

[21] Appl. No.: 733,566

[22] Filed: Oct. 18, 1996

[30] Foreign Application Priority Data

Oct. 20, 1995 [JP] Japan .................................. 7-297432

[51] Int. Cl.[6] .................................................. B29C 45/80
[52] U.S. Cl. .................................... 264/40.5; 425/150
[58] Field of Search ........................... 425/150; 264/40.5

[56] References Cited

U.S. PATENT DOCUMENTS

| 5,368,462 | 11/1994 | Kiefer et al. ...................... 425/150 |
| 5,370,518 | 12/1994 | Sasaki et al. ...................... 425/150 |
| 5,540,577 | 7/1996 | Ishikawa et al. ...................... 425/150 |

FOREIGN PATENT DOCUMENTS 7-76035   3/1995   Japan.

Primary Examiner—Tim Heitbrink
Attorney, Agent, or Firm—Birch, Stewart, Kolasch & Birch, LLP

[57] ABSTRACT

A position detecting system for an injection molding apparatus can detect the position of a plurality of movable portions of the injection molding apparatus. The position detecting system includes a single position detector capable of detecting respective positions of a plurality of objective portions arranged movably along a single scale portion. Each of the plurality of movable portions of the injection molding apparatus is coupled with one of the objective portions of the position detecting system and moves together with the respective objective portion.

20 Claims, 3 Drawing Sheets

POSITION DETECTING SYSTEM FOR AN INJECTION MOLDING APPARATUS

BACKGROUND OF THE INVENTION

1. Field of the Invention

The present invention relates to a position detecting system for an injection molding apparatus for detecting a position of a movable portion of the injection molding apparatus.

2. Description of the Related Art

In general, an injection molding apparatus includes various movable portions, such as an injection screw, an injection device, a pushing rod for a molded product, a movable base of a clamping device and so forth. Positions of respective movable portions are detected by a position detecting system and are feedback controlled so as to be precisely moved to target positions.

Conventionally, such a position detecting system has been constructed by associating position detectors to corresponding ones of the movable portions for exclusively detecting the position of the respective movable portion. For instance, in the position detecting system disclosed in Japanese Unexamined Patent Publication (Kokai) Heisei 7-76035, one specific position detector (position sensor) is provided along a moving direction of the injection screw for detecting the position of the injection screw. As the position detector, an absolute type linear scale is normally employed.

However, the conventional position detecting system encounters problems, since individual position detectors are assembled for respective moving portions.

First of all, a plurality of position detectors, corresponding in number to the number of the movable portions, are required. Plural detectors increase the number of parts and thereby the cost of the position detecting system.

Secondly, a large amount of wiring is required from each of the position detectors to a main body of a controller. The additional wiring makes the overall apparatus more complicated to assemble and lowers the reliability of the overall apparatus.

SUMMARY OF THE INVENTION

The present invention has as an objective to solve the problems in the prior art as set forth above. Therefore, it is an object of the present invention to provide a position detecting system for an injection molding apparatus which can reduce the number of parts required, thereby reducing the cost, while improving the ease of assembly and reliability of the overall apparatus.

According to the present invention, a position detecting system for an injection molding apparatus having a first plurality of movable portions, comprises:

a first position detector capable of detecting respective positions of a first plurality of magnets arranged movably along a first scale, the first position detector being arranged adjacent the first plurality of movable portions; and means for coupling each of the first plurality of movable portions with a respective magnet of the first plurality of magnets.

Also according to the present invention, a position detecting system for an injection molding apparatus having a movable portion, comprises:

a first position detector capable of detecting a position of a ferromagnetic object arranged movably along a single scale; and a link coupling the movable portion of the injection molding apparatus with the ferromagnetic object.

Also according to the present invention, a method of detecting a position of a movable portion of an injection molding machine, comprises:

providing a first detector including a pulse generator, a timer, and a vibration sensor;

providing an elongated wire and a first ferromagnetic object, the movable portion of the injection molding machine being coupled to the first ferromagnetic object;

generating an electrical pulse using the pulse generator;

promulgating the electrical pulse along the elongated wire;

interacting the electrical pulse with the first ferromagnetic object;

causing a first vibration in response to said interacting step;

receiving the first vibration using the vibration sensor;

determining a time between said generating step and said receiving step using said timer; and calculating a distance between the vibration sensor and the first ferromagnetic object.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. Further, well-known structures are not shown in detail in order to avoid obscuring the present invention.

At first, discussion will be given for an injection molding apparatus M including the preferred embodiment of a position detecting system 1 according to the present invention, with reference to FIGS. 1 and 2.

Figure 1:
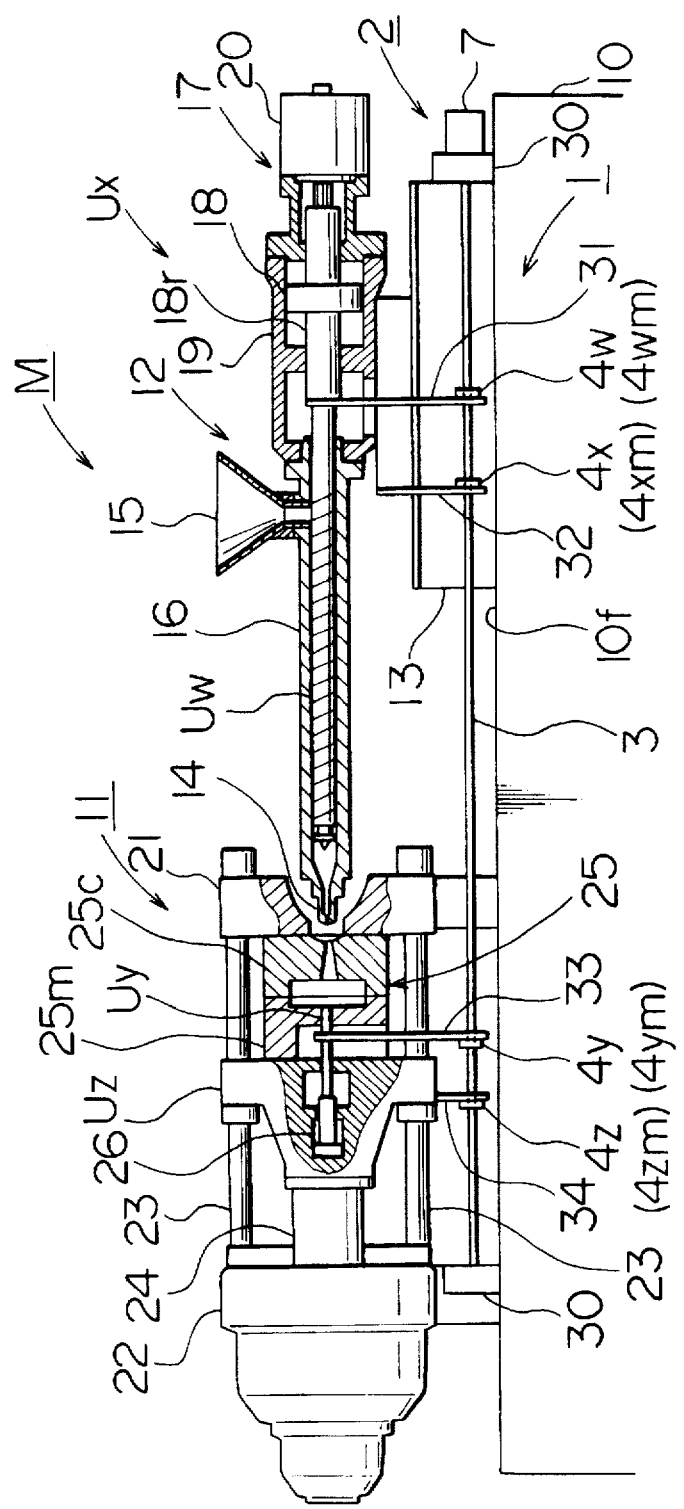
FIG. 1 is a partially sectioned side elevation of an injection molding apparatus including the preferred embodiment of a position detecting system according to the present invention.

In FIG. 1, the reference numeral 10 denotes a machine base. On an upper surface 10f of the machine base 10, an injection device Ux is arranged at one side. A clamping device 11 is arranged on the upper surface 10f at the other side.

The injection device Ux has a main body 12. The main body 12 is capable of moving back and forth from a nozzle touching position to a nozzle releasing position. The main body 12 is driven by a driving portion 13. The main body 12 has an injection nozzle 14 located at its front end, and a heating cylinder 16 with a hopper 15 at its rear portion. An injection screw Uw is inserted within the heating cylinder 16. Also, on the rear end of the heating cylinder 16, a screw driving portion 17 for driving the injection screw UW is provided. The screw driving portion 17 rotates and reciprocates the injection screw Uw. The screw driving portion 17 has an injection cylinder 19 housing therein a piston 18. The front end of a piston rod 18r is connected with the rear end of the injection screw Uw. The rear end of the piston rod 18r is splined with a shaft of an oil motor 20, arranged at the rear end of the injection cylinder 19.

The clamping device 11 includes a stationary platen 21 arranged between the injection nozzle 14 and a clamping cylinder 22. The stationary platen 21 and the clamping cylinder 22 are fixedly secured on the upper surface 10f of the machine base 10. A plurality of (four in the shown embodiment) horizontal tie bars 23 are extended between the stationary platen 21 and the clamping cylinder 22. A movable platen Uz is slidably supported on the tie bars 23. The movable platen Uz is connected with a ram 24 of the clamping cylinder 22. With this construction, the movable platen Uz can be moved in a back and forth direction, namely in a clamping direction and an unclamping direction.

A movable mold 25m of a mold 25 is mounted on the movable platen Uz, and a stationary mold 25c is mounted on the stationary platen 21. A push rod Uy extends from the movable platen Uz through the movable mold 25m. The push rod Uy is movable in the back and forth direction by means of a pushing cylinder 26 housed within the movable platen Uz. It should be noted that the push rod Uy has a function to enter into the mold 25 to push a molded product out of the mold.

Also on the upper surface 10f of the machine base 10, the preferred embodiment of a position detecting system 1 according to the invention is arranged. The position detecting system 1 includes a single position detector 2. The position detector 2 is arranged under the injection screw Uw, the injection device Ux, the pushing rod Uy for pushing out the molded product and the movable platen Uz of the clamping device 11. The position detector 2 has a scale potion 3 extended between a pair of support portions 30 and 30 rigidly secured on the upper surface 10f.

Figure 2:
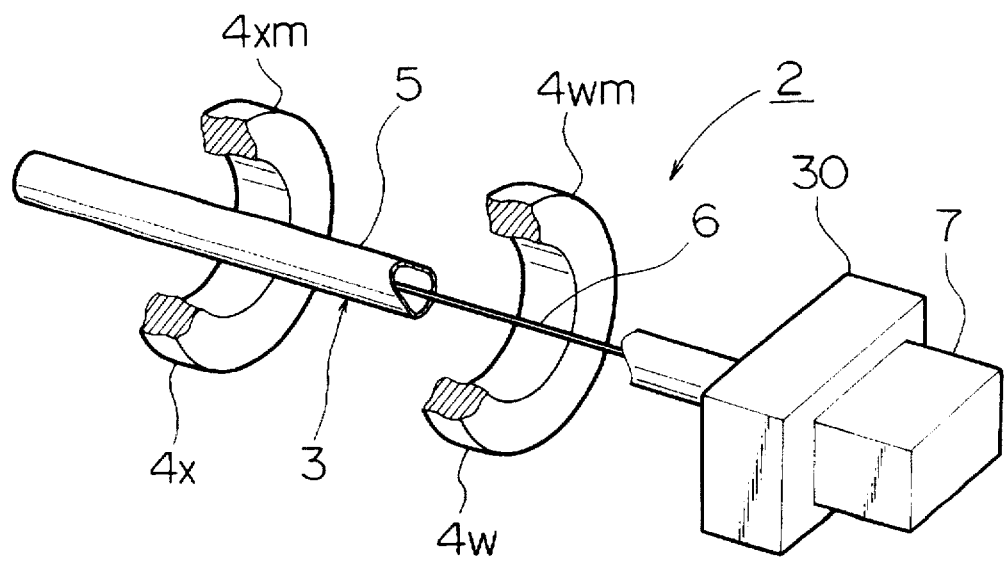
FIG. 2 is a perspective view showing a construction of a position detector to be employed in the preferred embodiment of the position detecting system.

A plurality of external magnets 4wm, 4xm, 4ym and 4zm (for positions 4w, 4x, 4y, 4z to be detected) are arranged on the outer periphery of the scale portion 3 (see FIG. 2). The external magnets 4wm, 4xm, 4ym and 4zm are movable. The scale portion 3 extends through the insides of the external magnets and does not contact the external magnets. The injection screw Uw is connected to the external magnet 4wm through a link member 31. Also, the injection device Ux is connected to the external magnet 4xm via a link member 32. The push rod Uy is connected to the external magnet 4ym via a link member 33. The movable platen Uz of the clamping device 11 is similarly connected to the external magnet 4zm via a link member 34. Therefore, the external magnets 4wm, 4xm, 4ym and 4zm are movable integrally with the injection screw Uw, the injection device Ux, the push rod Uy and the movable platen Uz of the clamping device 11, respectively.

A construction of the position detector 2 is shown in FIG. 2. In FIG. 2, the scale portion 3 includes a coiled wire 6 extending through a waveguide tube 5 (magnetostrictive line) or transducer. The external magnets 4wm, 4xm, 4ym, 4zm are formed into a ring-shaped configuration. At the end of the scale portion 3, a measurement processing portion 7 is provided. The measurement processing portion 7 is designed to supply a pulse current Ip to the coiled line 6 and to measure distances Lw, Lx, Ly and Lz to the external magnets 4wm, 4xm, 4ym and 4zm. The distance measurements are determined on the basis of propagation periods of a torsional mode ultrasonic vibration pulse Pe induced at the respective positions of the external magnets 4wm, 4xm, 4ym and 4zm, through the waveguide tube 5. The distance measurements are indicative of the respective positions of the injection screw Uw, the injection device Ux, the push rod Uy and the movable platen Uz of the clamping device. Thus, the position detector 2 utilizes the magnetostrictive effect (Wiedeman effect) by interaction of the magnetic field generated from respective ones of the external magnets 4wm, 4xm, 4ym and 4zm and the pulse current Ip supplied to the coiled wire 6, and an ultrasonic vibration propagating through a solid body at a constant speed.

Next, the operation of the shown embodiment of the position detecting system 1 will be discussed with reference to FIGS. 1 to 3.

Figure 3:
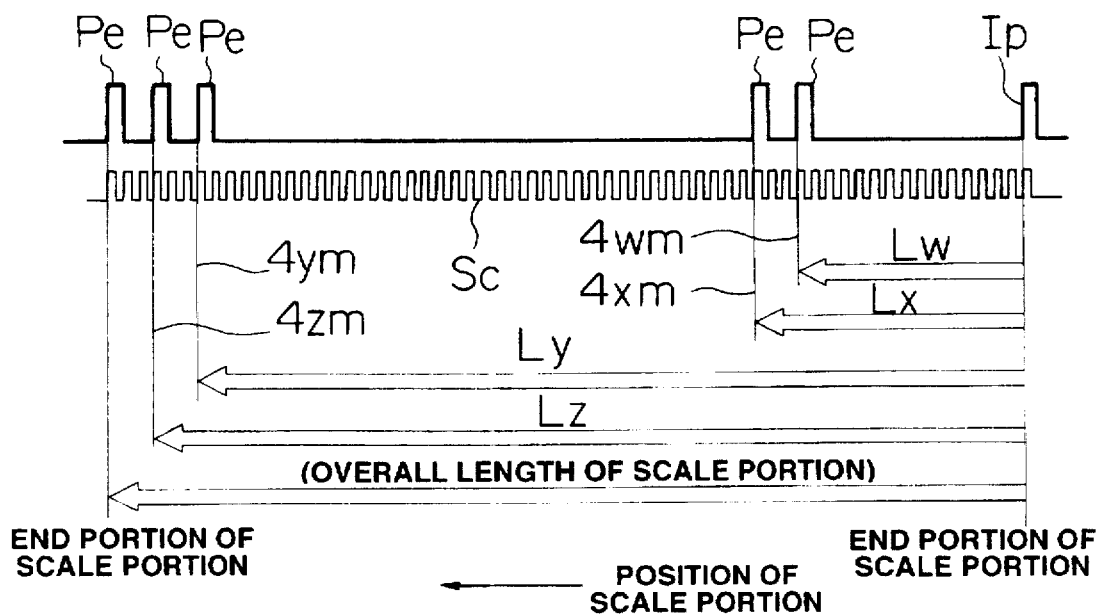
FIG. 3 is a chart for explaining a principle of operation of the position detector of FIG. 2.

At first, the measurement processing portion 7 supplies the pulse current Ip shown in FIG. 3 to the coiled wire 6. At the position of the external magnet 4wm, a torsional mode ultrasonic vibration pulse Pe is induced on the waveguide tube 5 by magnetostrictive effect due to interaction of the magnetic field generated by the external magnet 4wm and the pulse current Ip on the coiled wire 6. The ultrasonic vibration pulse Pe propagates through the waveguide tube 5 at a constant speed and is converted into a reception pulse, in the form of an electric signal, by means of an ultrasonic vibration detector of the measurement processing portion 7. The period of time between application of the pulse current Ip and detection of the reception pulse is proportional to the distance Lw between the end of the scale portion 3 and the external magnet 4wm. The measurement processing portion 7 derives the distance Lw to derive the position of the injection screw Uw. It should be noted that the period is measured by counting a reference clock Sc shown in FIG. 3. The positions of the other external magnets 4xm, 4ym and 4zm can be derived in the same manner.

In this case, the ultrasonic vibration pulses Pe are received by the measurement processing portion 7 with respective time differences. Namely, the ultrasonic vibration generated by the external magnet 4wm, located at a position closest to the measurement processing portion 7, is received earliest, and the ultrasonic vibration generated by the external magnet 4zm, located at a position most distant from the measurement processing portion 7, is received latest. Since the order of relative positions of respective external magnets 4wm, 4xm, 4ym and 4zm is held unchanged, by the ultrasonic vibration pulses Pe received in order, the distances Lw, Lx, Ly and Lz to respective external magnets 4wm, 4xm, 4ym and 4zm can be derived (see FIG. 3).

On the basis of the distances Lw, Lx, Ly and Lz to respective external magnets 4wm, 4xm, 4ym and 4zm, the positions of the injection screw Uw, the injection device Ux, the push rod Uy and the movable platen Uz can be derived. Namely, assuming a distance between the external magnet 4wm and the external magnet 4xm at the position where the injection screw Uw is advanced at the maximum magnitude, being α, the position Sw of the injection screw Uw can be calculated from $$Sw=Lx-Lw-\alpha$$

Also, assuming a distance between the external magnet 4xm and the measurement processing portion 7 (starting point) at a position where the injection device Ux is retarded at the maximum magnitude, being β, the position Sx of the injection device Ux can be derived from $$Sx=Lx-\beta$$

On the other hand, assuming that a distance between the external magnet 4ym and the external magnet 4zm at a position where the push rod Uy is retracted at the maximum magnitude is γ, the position Sy of the push rod Uy is derived from $$Sy=Lz-Ly-\gamma$$

Also,assuming that the distance between the external magnet 4zm to the measurement processing portion 7 (starting point) at a position where the movable platen Uz is advanced at the maximum magnitude, being δ, the position Sz of the movable platen Uz can be derived from $$Sz=Lz-\delta$$

Figure 4:
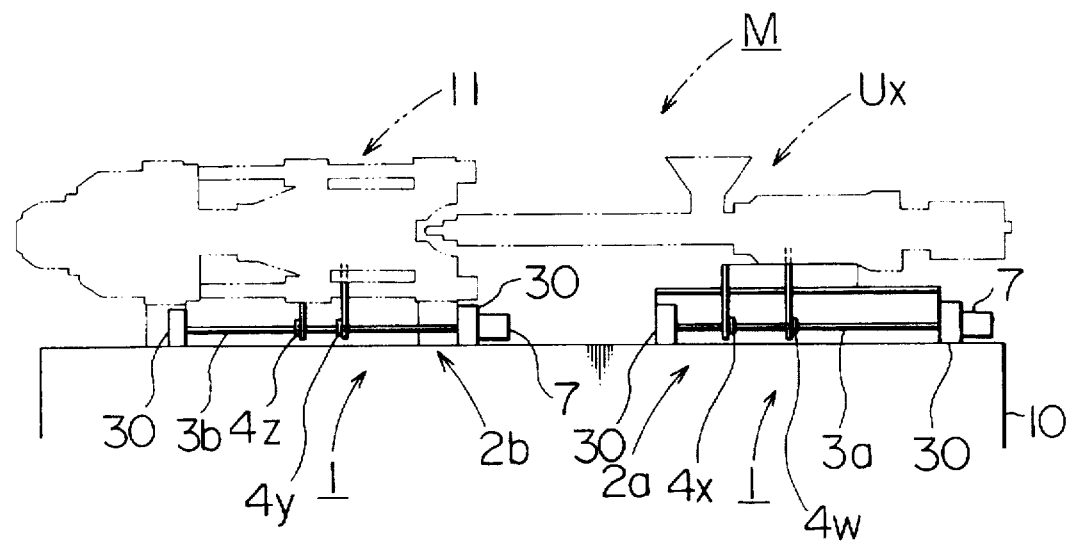
FIG. 4 is a schematic illustration showing a modification of the preferred embodiment of the position detecting system according to the present invention.
Figure 5:
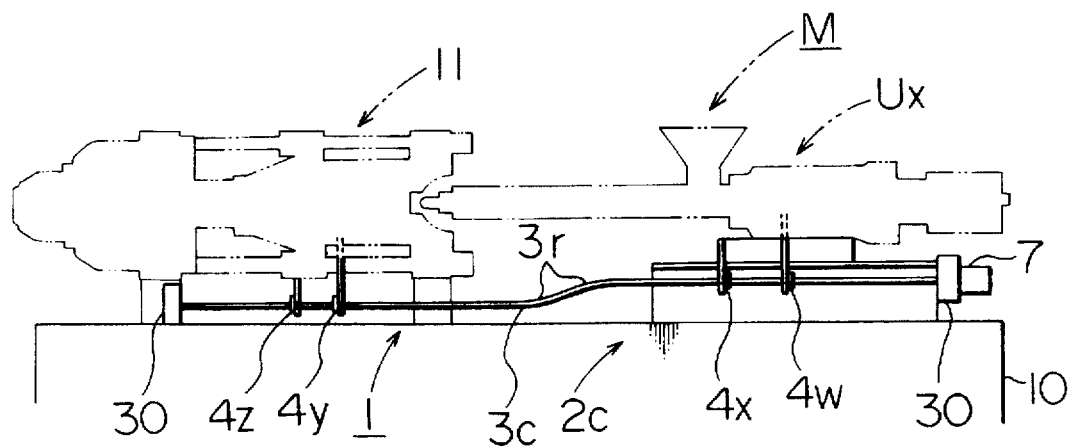
FIG. 5 is a schematic illustration showing another modification of the preferred embodiment of the position detecting system according to the present invention.

FIGS. 4 and 5 show modifications of the preferred embodiment of the position detecting system according to the invention. The modification shown in FIG. 4 is constructed by arranging one position detector 2a for two movable elements, i.e. the injection screw Uw and the injection device Ux, and another position detector 2b for another two movable elements, i.e., the push rod Uy and the movable platen Uz. IN FIG. 4, the reference numerals 3a and 3b denote scale portions of respective position detectors 2a and 2b. In FIG. 4, like elements to those in the former embodiment will be identified by like reference numerals, and a discussion for these elements has been omitted for the sake of clarity. The modified embodiment of FIG. 4 has substantially the same construction and function as the former embodiment of FIG. 1, except for the number of movable elements to be position detected by each position detector.

The modification of FIG. 5 employs a position detector 2c which has a scale portion 3c having a locally curved portion 3r. By this, the scale portion 3c can be arranged in various positions and adapted for various movable portions. Also, it is possible to bend the scale portion 3c at a right angle. In FIG. 5, like elements to those in the former embodiment will be identified by like reference numerals, and a discussion for these elements has been omitted for the sake of clarity. The modified embodiment of FIG. 5 has substantially the same construction and function as the former embodiment of FIG. 1, except for the curved portion 3r provided in the scale portion 3c.

As set forth above, the position detecting system for the injection molding apparatus according to the present invention can detect positions of a plurality of moving portions using a single scale portion.

Since a single position detector is required irrespective of the number of movable portions, the number of parts can be significantly reduced. Therefore, the cost of the injection molding apparatus can be reduced.

Since only one line of wiring is required for connecting the single position detecting system with the controller main body, the overall construction and reliability of the system can be simplified and improved.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

For instance, the position detector to be employed need not operate according to the principle as exemplified above, but can operate according to other principles. The movable elements to be detected are not specific to the present invention, and the present invention is applicable for any other movable elements.

What is claimed is:

1. A method of detecting a position of a movable portion of an injection molding machine, said method comprising the steps of:

providing a first detector including a pulse generator, a timer, and a vibration sensor;

providing an elongated wire and a first ferromagnetic object, the movable portion of the injection molding machine being coupled to the first ferromagnetic object;

generating an electrical pulse using the pulse generator;

promulgating the electrical pulse along the elongated wire;

interacting the electrical pulse with the first ferromagnetic object;

causing a first vibration in response to said interacting step;

receiving the first vibration using the vibration sensor;

determining a time between said generating step and said receiving step using said timer; and calculating a distance between the vibration sensor and the first ferromagnetic object.

2. The method according to claim 1, further comprising:

providing a guide adjacent the elongated wire, the guide being attached to the vibration sensor, and wherein said step of causing a first vibration includes vibrating said guide.

3. The method according to claim 1, further comprising:

providing a second ferromagnetic object, another movable object of the injection molding machine being coupled to the second ferromagnetic object;

further interacting the electrical pulse with the second ferromagnetic object;

causing a second vibration in response to said further interacting step;

further receiving the second vibration using the vibration sensor;

determining a time between said generating step and said further receiving step; and calculating a second distance between the vibration sensor and the second ferromagnetic object.

4. A position detecting system for an injection molding apparatus having a first plurality of movable portions, said position detecting system comprising:

a first position detector capable of detecting respective positions of a first plurality of magnets arranged movably along a first scale, said first position detector being arranged adjacent the first plurality of movable portions; and means for coupling each of the first plurality of movable portions with a respective magnet of said first plurality of magnets.

5. The position detecting system according to claim 4, wherein the first plurality of movable portions comprise at least two of an injection screw, an injection device, a push rod for pushing out a molded product, and a movable platen of a clamping device.

6. The position detecting system according to claim 4, wherein the first plurality of movable portions comprise an injection screw, an injection device, a push rod for pushing out a molded product, and a movable platen of a clamping device.

7. The position detecting system according to claim 4, further comprising:

a second position detector capable of detecting respective positions of a second plurality of magnets arranged movably along a second scale, wherein the injection molding apparatus includes a second plurality of movable portions, distinct from the first plurality of movable portions, and wherein said means for coupling includes means for coupling each of the second plurality of movable portions with a respective magnet of said second plurality of magnets.

8. The position detecting system according to claim 4, wherein said first scale has a curved portion.

9. The position detecting system according to claim 8, further comprising:

a second plurality of magnets arranged movably along said first scale, wherein said first scale includes a first straight portion connected to one end of said curved portion and a second straight portion connected to another end of said curved portion, wherein the injection molding apparatus includes a second plurality of movable portions, distinct from the first plurality of movable portions, and wherein said means for coupling includes means for coupling each of the second plurality of movable portions with a respective magnet of said second plurality of magnets, said first plurality of magnets being movable along said first straight portion and said second plurality of magnet being movable along said second straight portion.

10. The position detecting system according to claim 4, wherein said first position detector comprises:

said single scale, said single scale having a wire extending through a guide; and a measurement processor provided at one end of said single scale, said measurement processor supplying a pulse current to said wire and measuring a distance to one of said first plurality of magnets on a basis of a period of time for propagating a vibration pulse induced in the guide at a position of said one of said first plurality of magnets.

11. The position detecting system according to claim 10, wherein said wire is coiled.

12. The position detecting system according to claim 10, wherein said guide is tubular and serves as a transducer.

13. A position detecting system for an injection molding apparatus having a movable portion, said position detecting system comprising:

a first position detector capable of detecting a position of a ferromagnetic object arranged movably along a single scale; and a link coupling the movable portion of the injection molding apparatus with the ferromagnetic object.

14. The position detecting system according to claim 13, wherein said ferromagnetic object comprises a magnet.

15. The position detecting system according to claim 13, wherein said first position detector comprises an electrical pulse generator and a vibration sensor; and wherein said single scale comprises an elongated wire.

16. The position detecting system according to claim 15, wherein said single scale further comprises a guide, said guide extending alongside said elongated wire.

17. The position detecting system according to claim 16, wherein said wire is twisted and said guide is tubular, surrounds said wire, and serves as a transducer.

18. The position detecting system according to claim 13, wherein said ferromagnetic object comprises a magnet having a hole therein, said single scale comprises an elongated wire, and said magnet is movably arranged relative to said wire with said wire passing through said hole in said magnet.

19. The position detecting system according to claim 18, wherein said single scale further comprises a guide, said guide extending alongside said elongated wire.

20. The position detecting system according to claim 19, wherein said wire is twisted and said guide is a tubular, surrounds said wire, and serves as a transducer.

* * * * *